US012512878B2

(12) United States Patent
Feng et al.

(10) Patent No.: US 12,512,878 B2
(45) Date of Patent: Dec. 30, 2025

(54) COOPERATIVE PRECODING METHOD AND APPARATUS

(71) Applicant: Beijing University Of Posts and Telecommunications, Beijing (CN)

(72) Inventors: Zhiyong Feng, Beijing (CN); Zhiqing Wei, Beijing (CN); Wangjun Jiang, Beijing (CN); Ping Zhang, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 396 days.

(21) Appl. No.: 18/105,459

(22) Filed: Feb. 3, 2023

(65) Prior Publication Data

US 2023/0268960 A1 Aug. 24, 2023

(30) Foreign Application Priority Data

Feb. 22, 2022 (CN) .......................... 202210161314.4

(51) Int. Cl.
*H04B 7/024* (2017.01)
*G01S 7/02* (2006.01)
*H04B 7/0456* (2017.01)

(52) U.S. Cl.
CPC ............ *H04B 7/024* (2013.01); *G01S 7/0234* (2021.05); *H04B 7/0456* (2013.01)

(58) Field of Classification Search
CPC ..... H04B 7/024; H04B 7/0456; G01S 7/0234; G01S 7/006; G01S 7/36; G01S 7/41; Y02D 30/70; H04W 52/42

(Continued)

(56) References Cited

U.S. PATENT DOCUMENTS

| | | | |
|---|---|---|---|
| 6,813,263 B1 | 11/2004 | Margherita | |
| 2023/0309144 A1* | 9/2023 | Zhu | .................. H04W 56/0015 |
| 2023/0358854 A1* | 11/2023 | Yao | ........................... G01S 7/41 |

FOREIGN PATENT DOCUMENTS

| | | | | |
|---|---|---|---|---|
| CN | 1949136 A | * | 4/2007 | ............. H04L 12/10 |
| CN | 105388464 A | * | 3/2016 | |

(Continued)

OTHER PUBLICATIONS

English Abstract: Zhang Ning-bo et al. "An Improved Signal-to-Leakage-and-Noise Ratio Multi-User Preconding Algorithm", Journal of Electronics & Information Technology, vol. 31, No. 9, p. 2162-2165, Sep. 2009.

(Continued)

*Primary Examiner* — Khaled M Kassim
*Assistant Examiner* — Oladiran Gideon Olaleye
(74) *Attorney, Agent, or Firm* — Jason A. Smith; Shumaker, Loop & Kendrick, LLP

(57) ABSTRACT

A cooperative precoding method and device. The method includes: obtaining a first sensing and communication signal sent by a first node; obtaining a second sensing and communication signal sent by a second node; updating the first sensing and communication signal; updating the second sensing and communication signal; returning to the step of obtaining a first sensing and communication signal when the signal-to-noise ratio of a signal received by a user and the signal-to-noise ratio of a radar echo signal received by the first node do not meet a preset condition. The solutions enhance sensing performance of nodes while at the same time improve the communication performance of a target user.

12 Claims, 8 Drawing Sheets

(58) Field of Classification Search
USPC .......................................................... 370/329
See application file for complete search history.

(56) References Cited

FOREIGN PATENT DOCUMENTS

| CN | 106324595 A | * | 1/2017 | ............ G01S 13/89 |
|---|---|---|---|---|
| CN | 110691343 A | | 1/2020 | |
| CN | 111682888 A | | 9/2020 | |
| CN | 113922854 A | * | 1/2022 | |
| KR | 20090023879 A | | 3/2009 | |
| KR | 20210096948 A | | 8/2021 | |
| WO | 2014048193 A1 | | 4/2014 | |

OTHER PUBLICATIONS

English Abstract: Yu-lin Wu et al. "Diffusion Strategy for Cooperating Spectrum Sensing Based on Distributed Estimation" Computer Simulation, vol. 30, No. 5, p. 199-202, May 15, 2013.

S. Lenty Stuwart et al. "Precoder Based Collaborative Blind Multiuser Detection of CDMA Signals" Wireless Pers Commun, Feb. 15, 2015 (14 pages total).

English Abstract: Zhiqing Wei et al. "Terahertz joint communication and sensing waveform: status and prospect" Journal on Communications, vol. 43, No. 1, Jan. 2022 (8 pages).

* cited by examiner

COOPERATIVE PRECODING METHOD AND APPARATUS

CROSS-REFERENCE TO RELATED APPLICATION

The present application claims the priority to a Chinese Patent Application No. 202210161314.4, filed with the China National Intellectual Property Administration on Feb. 22, 2022 and entitled "COOPERATIVE PRECODING METHOD AND APPARATUS", which is incorporated herein by reference in its entirety.

TECHNICAL FIELD

The present disclosure relates to the technical field of integrated sensing and communication mutual interference coordination processing, in particular to a cooperative precoding method and apparatus.

BACKGROUND

Currently, spectrum resources are in short supply. In order to pursue more efficient spectrum utilization, in a multi-node cooperative communication sensing system, a scheme of sharing spectrum resources is mostly used between nodes. At this time, how to coordinate and deal with the mutual interference problem between nodes is a prerequisite for ensuring system performance.

In existing communication systems, the COMP technology is mainly used to solve the problem of coordinating and dealing with the same-frequency mutual interference between nodes. The essence of COMP technology is to provide users with higher rates by coordinating interference between different nodes, avoiding interference, or converting interference into useful signals, thereby improving network utilization.

In the existing radar system, the main consideration of the interference between radars is that the direct and reflected signals between the radars will interfere with the radar detection. At present, the schemes commonly used for inter-radar interference mainly include four categories: frequency division, phase division, space division, and interference elimination. Among them, the space division scheme mainly realizes the staggering of detection signals between radars through the adjustment of detection beams, thereby reducing interference. However, the influence of channel information on beam adjustment is not considered in traditional radar systems, and the use of space division schemes has limited mitigation effect on inter-radar interference.

The node with integrated sensing and communication can send the integrated sensing and communication signal and provide communication data transmission and radar sensing service for a target user at the same time. Therefore, there exist not only communication mutual interference between multi nodes with integrated sensing and communication, but also radar sensing mutual interference. How to jointly process communication mutual interference and radar sensing mutual interference is a technical problem to be solved at present.

SUMMARY

An objective of the present disclosure is to provide a cooperative precoding method and apparatus so as to solve the problem in the prior art of how to jointly process cooperative precoding in the event that between nodes with integrated sensing and communication, there exist not only communication mutual interference, but also radar sensing echo mutual interference.

To achieve the above-described objective, an embodiment of the present disclosure provides a cooperative precoding method including:

obtaining a first sensing and communication signal sent by a first node based on a problem of interference between multi-user data;

obtaining a second sensing and communication signal sent by a second node based on a problem of communication signal interference between the first node and the second node and the first sensing and communication signal;

updating the first sensing and communication signal based on a problem of multi-path radar echo interference of the first node, the first sensing and communication signal, and the second sensing and communication signal;

updating the second sensing and communication signal based on a problem of radar echo interference between the second node and the first node, the updated first sensing and communication signal, and the second sensing and communication signal;

returning to the step of obtaining a first sensing and communication signal when a signal-to-noise ratio of a signal received by a user and a signal-to-noise ratio of a radar echo signal received by the first node do not meet a preset condition, wherein the preset condition is: the signal-to-noise ratio of the signal received by the user is larger than a first signal-to-noise ratio threshold and the signal-to-noise ratio of the radar echo signal received by the first node is larger than a second signal-to-noise ratio threshold.

Optionally, before the obtaining a first sensing and communication signal sent by a first node based on a problem of interference between multi-user data, the method further includes:

obtaining a first matrix, a second matrix, a third matrix, and a fourth matrix based on a pre-constructed integrated sensing and communication mutual interference channel model, wherein the first matrix is a communication channel matrix of the first node, the second matrix is a communication interference channel matrix of the second node, the third matrix is a radar echo channel matrix of the first node, and the fourth matrix is a radar echo interference channel matrix of the second node.

Optionally, the cooperative precoding method further includes:

constructing the integrated sensing and communication mutual interference channel model according to the following steps:

constructing a communication mutual interference channel model and a radar sensing echo mutual interference channel model respectively;

constructing the integrated sensing and communication mutual interference channel model based on the communication mutual interference channel model and the radar sensing echo mutual interference channel model.

Optionally, in the cooperative precoding method, constructing a communication mutual interference channel model includes:

obtaining a channel from the first node to a target user and a channel from the second node to the target user based on a steering vector of a transmitting antenna of the first node and a steering vector of a transmitting antenna of the second node;

obtaining a communication channel of the first node and a communication channel of the second node based on the channel from the first node to the target user and the channel from the second node to the target user;

constructing the communication mutual interference channel model based on the communication channel of the first node and the communication channel of the second node.

Optionally, in the cooperative precoding method, constructing a radar sensing echo mutual interference channel model includes:

constructing the radar sensing echo mutual interference channel model based on a radar echo channel of the first node and a radar echo interference channel of the second node.

Optionally, in the cooperative precoding method, the problem of interference between multi-user data includes:

solving a minimum value of a transmitting signal total power of the first node when a first constraint condition is satisfied;

wherein, the first constraint condition includes:

a ratio between a sum of a useful signal received by a user and a white Gaussian noise of a communication channel, and the useful signal received by the user, is smaller than or equal to a reciprocal of a first sub-signal-to-noise threshold, wherein the useful signal received by the user is obtained according to the first matrix;

a signal data matrix of the first node is larger than or equal to a first preset value.

Optionally, in the cooperative precoding method, the problem of communication signal interference between the second node and the first node includes:

solving a minimum value of a transmitting signal total power of the second node when a second constraint condition is satisfied;

wherein, the second constraint condition includes:

a ratio between an interference signal of the second node and a useful signal received by a user is smaller than or equal to a reciprocal of a second sub-signal-to-noise threshold, wherein the interference signal of the second node is obtained according to the second matrix;

a signal data matrix of the first node is larger than or equal to a first preset value.

Optionally, in the cooperative precoding method, the problem of multi-path echo interference of the first node includes:

solving a minimum value of a transmitting signal total power of the first node when a third constraint condition is satisfied;

wherein, the third constraint condition includes:

a ratio between a sum of a useful radar echo signal received by the first node and a white Gaussian noise of a radar echo channel, and the useful radar echo signal received by the first node, is smaller than or equal to a reciprocal of a third sub-signal-to-noise threshold, wherein the useful radar echo signal received by the first user is obtained according to the third matrix.

Optionally, in the cooperative precoding method, the problem of radar echo interference between the second node and the first node includes:

solving a minimum value of a transmitting signal total power of the second node when a fourth constraint condition is satisfied;

wherein, the fourth constraint condition includes:

a ratio between a radar echo interference signal of the second node and a useful radar echo signal received by the first node is smaller than or equal to a reciprocal of a fourth sub-signal-to-noise threshold, wherein the radar echo interference signal of the second node is obtained according to the fourth matrix.

An embodiment of the present disclosure further provides an electronic device comprising a processor and a transceiver, wherein:

the processor is configured to obtain a first sensing and communication signal sent by a first node based on a problem of interference between multi-user data;

the processor is further configured to obtain a second sensing and communication signal sent by a second node based on a problem of communication signal interference between the first node and the second node and the first sensing and communication signal;

the processor is further configured to update the first sensing and communication signal based on a problem of multi-path radar echo interference of the first node, the first sensing and communication signal, and the second sensing and communication signal;

the processor is further configured to update the second sensing and communication signal based on a problem of radar echo interference between the second node and the first node, the updated first sensing and communication signal, and the second sensing and communication signal;

the processor is further configured to return to the step of obtaining a first sensing and communication signal when a signal-to-noise ratio of a signal received by a user and a signal-to-noise ratio of a radar echo signal received by the first node do not meet a preset condition, wherein the preset condition is: the signal-to-noise ratio of the signal received by the user is larger than a first signal-to-noise ratio threshold and the signal-to-noise ratio of the radar echo signal received by the first node is larger than a second signal-to-noise ratio threshold.

Optionally, the processor of the electronic device is further configured to obtain a first matrix, a second matrix, a third matrix, and a fourth matrix based on a pre-constructed integrated sensing and communication mutual interference channel model, wherein the first matrix is a communication channel matrix of the first node, the second matrix is a communication interference channel matrix of the second node, the third matrix is a radar echo channel matrix of the first node, and the fourth matrix is a radar echo interference channel matrix of the second node.

Optionally, the processor of the electronic device is further configured to construct the integrated sensing and communication mutual interference channel model according to the following steps:

constructing a communication mutual interference channel model and a radar sensing echo mutual interference channel model respectively;

constructing the integrated sensing and communication mutual interference channel model based on the communication mutual interference channel model and the radar sensing echo mutual interference channel model.

Optionally, the processor of the electronic device is specifically configured to obtain a channel from the first node to a target user and a channel from the second node to the target user based on a steering vector of a transmitting antenna of the first node and a steering vector of a transmitting antenna of the second node;

obtain a communication channel of the first node and a communication channel of the second node based on the channel from the first node to the target user and the channel from the second node to the target user;

construct the communication mutual interference channel model based on the communication channel of the first node and the communication channel of the second node.

Optionally, the processor of the electronic device is specifically configured to construct the radar sensing echo mutual interference channel model based on a radar echo channel of the first node and a radar echo interference channel of the second node.

Optionally, the processor of the electronic device is specifically configured to solve a minimum value of a transmitting signal total power of the first node when a first constraint condition is satisfied;

wherein, the first constraint condition includes:

a ratio between a sum of a useful signal received by a user and a white Gaussian noise of a communication channel, and the useful signal received by the user, is smaller than or equal to a reciprocal of a first sub-signal-to-noise threshold, wherein the useful signal received by the user is obtained according to the first matrix;

a signal data matrix of the first node is larger than or equal to a first preset value.

Optionally, the processor of the electronic device is specifically configured to solve a minimum value of a transmitting signal total power of the second node when a second constraint condition is satisfied;

wherein, the second constraint condition includes:

a ratio between an interference signal of the second node and a useful signal received by a user is smaller than or equal to a reciprocal of a second sub-signal-to-noise threshold, wherein the interference signal of the second node is obtained according to the second matrix;

a signal data matrix of the first node is larger than or equal to a first preset value.

Optionally, the processor of the electronic device is specifically configured to solve a minimum value of a transmitting signal total power of the first node when a third constraint condition is satisfied;

wherein, the third constraint condition includes:

a ratio between a sum of a useful radar echo signal received by the first node and a white Gaussian noise of a radar echo channel, and the useful radar echo signal received by the first node, is smaller than or equal to a reciprocal of a third sub-signal-to-noise threshold, wherein the useful radar echo signal received by the first user is obtained according to the third matrix.

Optionally, the processor of the electronic device is specifically configured to solve a minimum value of a transmitting signal total power of the second node when a fourth constraint condition is satisfied;

wherein, the fourth constraint condition includes:

a ratio between a radar echo interference signal of the second node and a useful radar echo signal received by the first node is smaller than or equal to a reciprocal of a fourth sub-signal-to-noise threshold, wherein the radar echo interference signal of the second node is obtained according to the fourth matrix.

An embodiment of the present disclosure further provides a cooperative precoding apparatus comprising:

a first obtaining module, configured to obtain a first sensing and communication signal sent by a first node based on a problem of interference between multi-user data;

a second obtaining module, configured to obtain a second sensing and communication signal sent by a second node based on a problem of communication signal interference between the first node and the second node and the first sensing and communication signal;

a first updating module, configured to update the first sensing and communication signal based on a problem of multi-path radar echo interference of the first node, the first sensing and communication signal, and the second sensing and communication signal;

a second updating module, configured to update the second sensing and communication signal based on a problem of radar echo interference between the second node and the first node, the updated first sensing and communication signal, and the second sensing and communication signal;

a returning module, configured to return to the step of obtaining a first sensing and communication signal when a signal-to-noise ratio of a signal received by a user and a signal-to-noise ratio of a radar echo signal received by the first node do not meet a preset condition, wherein the preset condition is: the signal-to-noise ratio of the signal received by the user is larger than a first signal-to-noise ratio threshold and the signal-to-noise ratio of the radar echo signal received by the first node is larger than a second signal-to-noise ratio threshold.

Optionally, the cooperative precoding apparatus further includes:

an obtaining module, configured to obtain a first matrix, a second matrix, a third matrix, and a fourth matrix based on a pre-constructed integrated sensing and communication mutual interference channel model, wherein the first matrix is a communication channel matrix of the first node, the second matrix is a communication interference channel matrix of the second node, the third matrix is a radar echo channel matrix of the first node, the fourth matrix is a radar echo interference channel matrix of the second node.

Optionally, the cooperative precoding apparatus further includes:

a constructing module, configured to construct the integrated sensing and communication mutual interference channel model according to the following steps:

constructing a communication mutual interference channel model and a radar sensing echo mutual interference channel model respectively;

constructing the integrated sensing and communication mutual interference channel model based on the communication mutual interference channel model and the radar sensing echo mutual interference channel model.

Optionally, in the cooperative precoding apparatus, the constructing module is specifically configured to:

obtain a channel from the first node to a target user and a channel from the second node to the target user based on a steering vector of a transmitting antenna of the first node and a steering vector of a transmitting antenna of the second node;

obtain a communication channel of the first node and a communication channel of the second node based on the channel from the first node to the target user and the channel from the second node to the target user;

construct the communication mutual interference channel model based on the communication channel of the first node and the communication channel of the second node.

Optionally, in the cooperative precoding apparatus, the constructing module is specifically configured to:

construct the radar sensing echo mutual interference channel model based on a radar echo channel of the first node and a radar echo interference channel of the second node.

Optionally, in the cooperative precoding apparatus, the first obtaining module is specifically configured to:

solve a minimum value of a transmitting signal total power of the first node when a first constraint condition is satisfied;

wherein, the first constraint condition includes:

a ratio between a sum of a useful signal received by a user and a white Gaussian noise of a communication channel, and the useful signal received by the user, is smaller than or equal to a reciprocal of a first sub-signal-to-noise threshold, wherein the useful signal received by the user is obtained according to the first matrix;

a signal data matrix of the first node is larger than or equal to a first preset value.

Optionally, in the cooperative precoding apparatus, the second obtaining module is specifically configured to:

solve a minimum value of a transmitting signal total power of the second node when a second constraint condition is satisfied;

wherein, the second constraint condition includes:

a ratio between an interference signal of the second node and a useful signal received by a user is smaller than or equal to a reciprocal of a second sub-signal-to-noise threshold, wherein the interference signal of the second node is obtained according to the second matrix;

a signal data matrix of the first node is larger than or equal to a first preset value.

Optionally, in the cooperative precoding apparatus, the first updating module is specifically configured to:

solve a minimum value of a transmitting signal total power of the first node when a third constraint condition is satisfied;

wherein, the third constraint condition includes:

a ratio between a sum of a useful radar echo signal received by the first node and a white Gaussian noise of a radar echo channel, and the useful radar echo signal received by the first node, is smaller than or equal to a reciprocal of a third sub-signal-to-noise threshold, wherein the useful radar echo signal received by the first user is obtained according to the third matrix.

Optionally, in the cooperative precoding apparatus, the second updating module is specifically configured to:

solve a minimum value of a transmitting signal total power of the second node when a fourth constraint condition is satisfied;

wherein, the fourth constraint condition includes:

a ratio between a radar echo interference signal of the second node and a useful radar echo signal received by the first node is smaller than or equal to a reciprocal of a fourth sub-signal-to-noise threshold, wherein the radar echo interference signal of the second node is obtained according to the fourth matrix.

An embodiment of the present disclosure also provides an electronic device, comprising: a transceiver, a processor, a memory, and programs or instructions stored in the memory and executable by the processor; wherein the programs or instructions, when executed by the processor, cause the processor to implement the above cooperative precoding method.

An embodiment of the present disclosure also provides a readable storage medium having stored thereon programs or instructions, that when being executed by a processor, cause the processor to implement the above cooperative precoding method.

The beneficial effects of the above-described technical solutions of the present disclosure are as follows:

In embodiments of the present disclosure, wherein, a first sensing and communication signal sent by a first node is obtained based on a problem of interference between multi-user data, a second sensing and communication signal sent by a second node is obtained based on a problem of communication signal interference between the first node and the second node and the first sensing and communication signal, the first sensing and communication signal is updated based on a problem of multi-path radar echo interference of the first node, the first sensing and communication signal, and the second sensing and communication signal, the second sensing and communication signal is updated based on a problem of radar echo interference between the second node and the first node, the updated first sensing and communication signal, and the second sensing and communication signal, and in the event that the signal-to-noise ratio of a signal received by a user and the signal-to-noise ratio of a radar echo signal received by the first node do not meet a preset condition, returning to the step of obtaining a first sensing and communication signal, which solves the problem of joint processing in the event that between nodes with integrated sensing and communication, there exist communication interference and radar sensing echo mutual interference, which enhancing the sensing performance of nodes with integrated sensing and communication while at the same time improving the communication performance of a target user.

DETAILED DESCRIPTION

Figure 1:
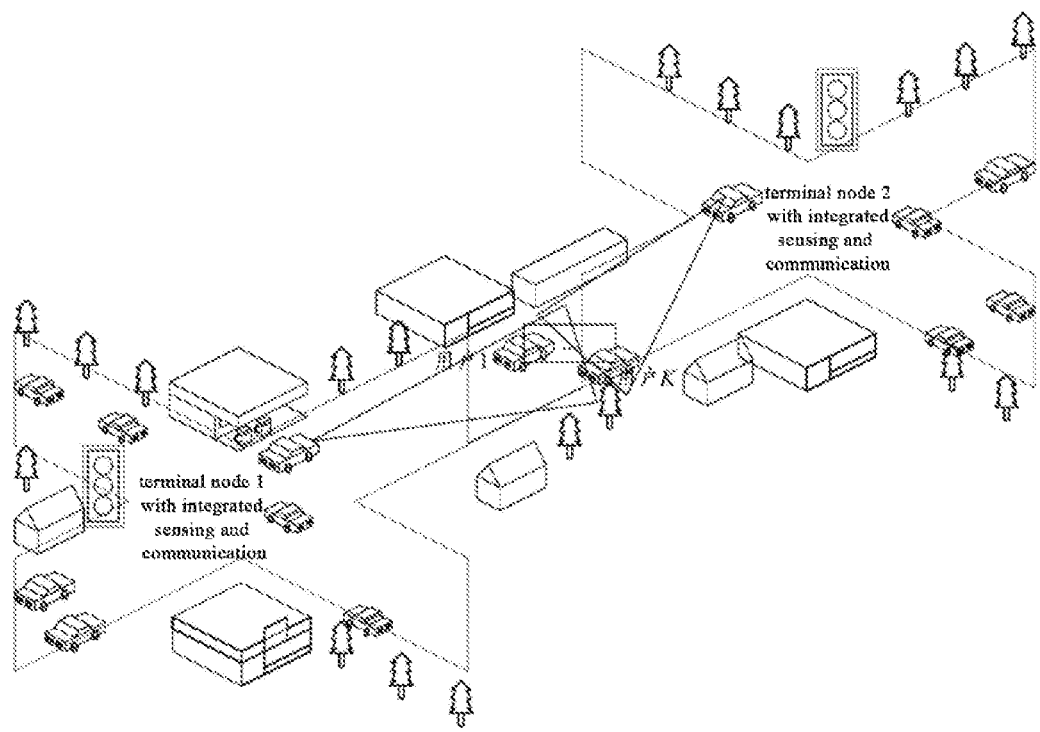
FIG. 1 is a scenario diagram of cooperative precoding between terminal nodes with integrated sensing and communication according to an embodiment of the present disclosure.

In order to make the technical problem to be solved, technical solutions and advantages of the present disclosure clearer, detailed description is made below with reference to the appended drawings and specific embodiments.

It should be understood that reference throughout this specification to "one embodiment" or "an embodiment" means that a particular feature, structure, or characteristic related to embodiments is included in at least one embodiment of the present disclosure. Thus, appearances of "in one embodiment" or "in an embodiment" in various places throughout the specification are not necessarily referring to a same embodiment. Furthermore, the particular features, structures or characteristics may be combined in any suitable manner in one or more embodiments.

In various embodiments of the present disclosure, it should be understood that the order of the serial numbers of the following processes does not mean the order of execution, and the order of execution of each process should be determined by its functions and internal logic, and should not impose limitations on the implementation process of the embodiment of the present disclosure.

Additionally, the terms "system" and "network" are often used herein interchangeably.

In the embodiments provided by the present application, it should be understood that "B corresponding to A" means that B is associated with A, and B can be determined according to A. But it should also be understood that determining B based on A does not mean determining B only based on A, and that B can also be determined based on A and/or other information.

Regarding the problem in the prior art of how to jointly process cooperative precoding in the event that between nodes with integrated sensing and communication, there exist not only communication interference but also radar sensing echo mutual interference, embodiments of the present disclosure provide a cooperative precoding method and device.

It should be noted that the design problem $\Phi_0$ of cooperative precoding can be described as: minimizing a total power $P_t$ of transmitted signals of an integrated node while satisfying a constraint of SINR (signal-to-noise ratio) of a signal received by a user and a constraint of SINR of a radar echo signal received by a node 1 (i.e., a first node) with integrated sensing and communication, of which a specific formula is described as follows:

$$\Phi_0: \min_{X_1, X_2} P_t$$

$$\text{s.t. } X_1 = \sum_{i=1}^{K} w_{i,t}^T s_i$$

-continued $$\hat{y}_{c,i} \geq F_{c,i}$$

$$\hat{y}_R \geq F_R$$

It should also be noted that in an actual process of sending a signal, the transmitting power of each antenna is limited. Assuming that the number of transmitting antennas of a node is $N_t$ and the power of each antenna is subject to the same constraint, then the constraint on the transmitting power of a single antenna is expressed as follows:

$$\frac{1}{L} \operatorname{diag}(X_1 X_1^H) < \frac{P_t}{N_t}$$

$$\frac{1}{L} \operatorname{diag}(X_2 X_2^H) < \frac{P_t}{N_t}$$

wherein, $X_1$ is a first sensing and communication signal sent by the first node; $X_2$ is a second sensing and communication signal sent by the second node; K is the number of users; i represents the $i^{th}$ user; $w_{i,t}$ is a precoded code of a transmitting antenna array of the first node; $s_i$ is a user data series; $y_{c,i}$ is the SINR of a signal received by the $i^{th}$ user; $F_{C,i}$ is a first signal-to-noise ratio threshold; $y_R$ is the SINR of a radar echo signal received by the node 1 with integrated sensing and communication; $F_R$ is a second signal-to-noise ratio threshold; L represents the length of a data stream.

As the design problem $\Phi_0$ of cooperative precoding is a non-convex problem with many constraint conditions and high solving complexity, the design problem $\Phi_0$ of cooperative precoding is decomposed into four problems in the following step S401 to step S404, and hierarchical optimization is achieved by multi-iteration calculation.

It should also be noted that the cooperative precoding method of the embodiment of the present disclosure is applicable to scenarios such as automobile transportation, industrial flexible manufacturing. In addition, the node with integrated sensing and communication in the embodiment of the present disclosure is applicable to terminal and base station nodes.

Figure 2:
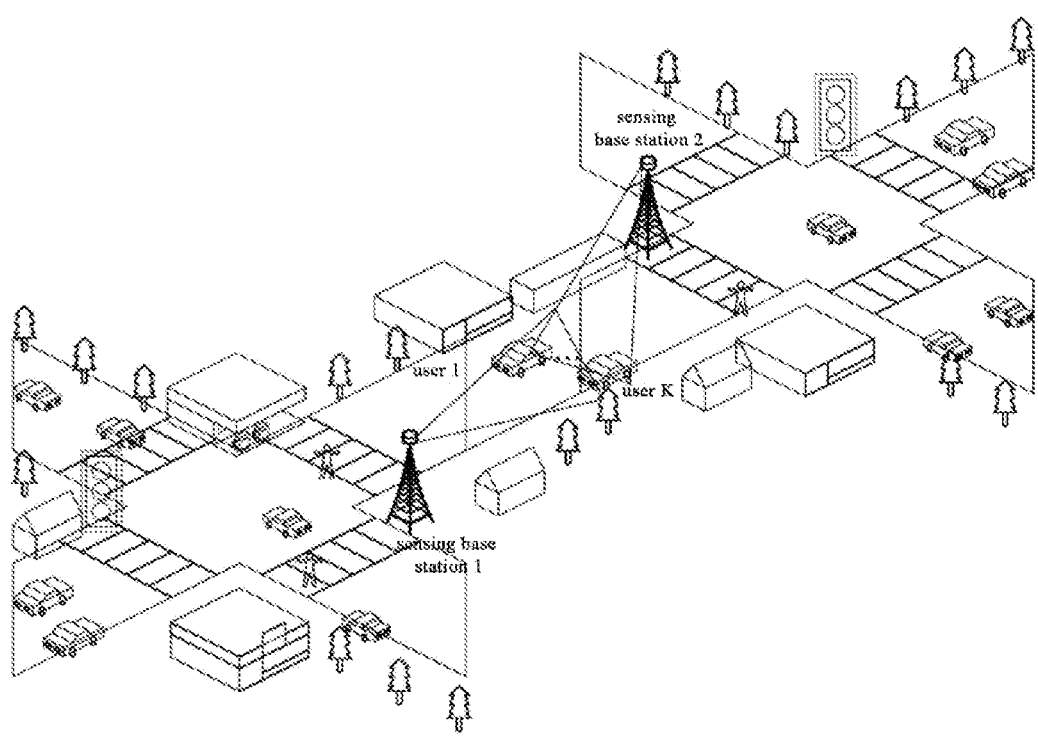
FIG. 2 is a scenario diagram of cooperative precoding between sensing base stations according to an embodiment of the present disclosure.
Figure 3:
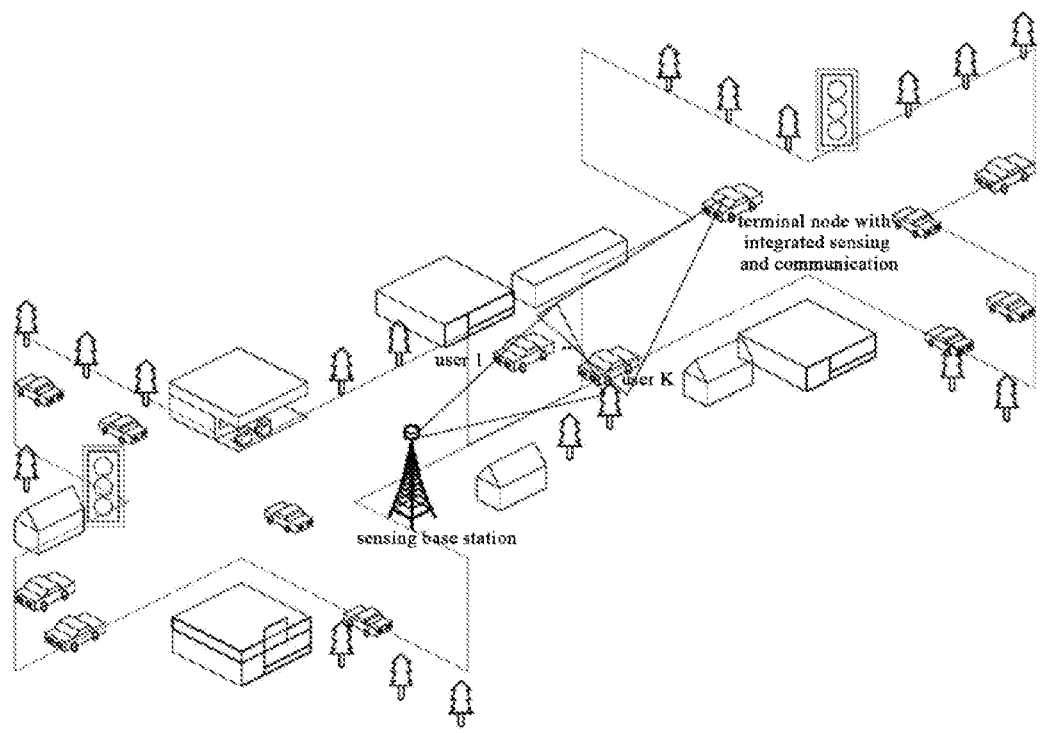
FIG. 3 is a scenario diagram of cooperative precoding between sensing base stations and terminal nodes with integrated sensing and communication according to an embodiment of the present disclosure.

Specifically, the embodiment of the present disclosure uses a scenario of automobile transportation as an example, and includes, but is not limited to, cooperative precoding between terminal nodes with integrated sensing and communication as shown in FIG. 1, between sensing base stations as shown in FIG. 2, and between a sensing base station and a terminal node with integrated sensing and communication as shown in FIG. 3.

Figure 4:
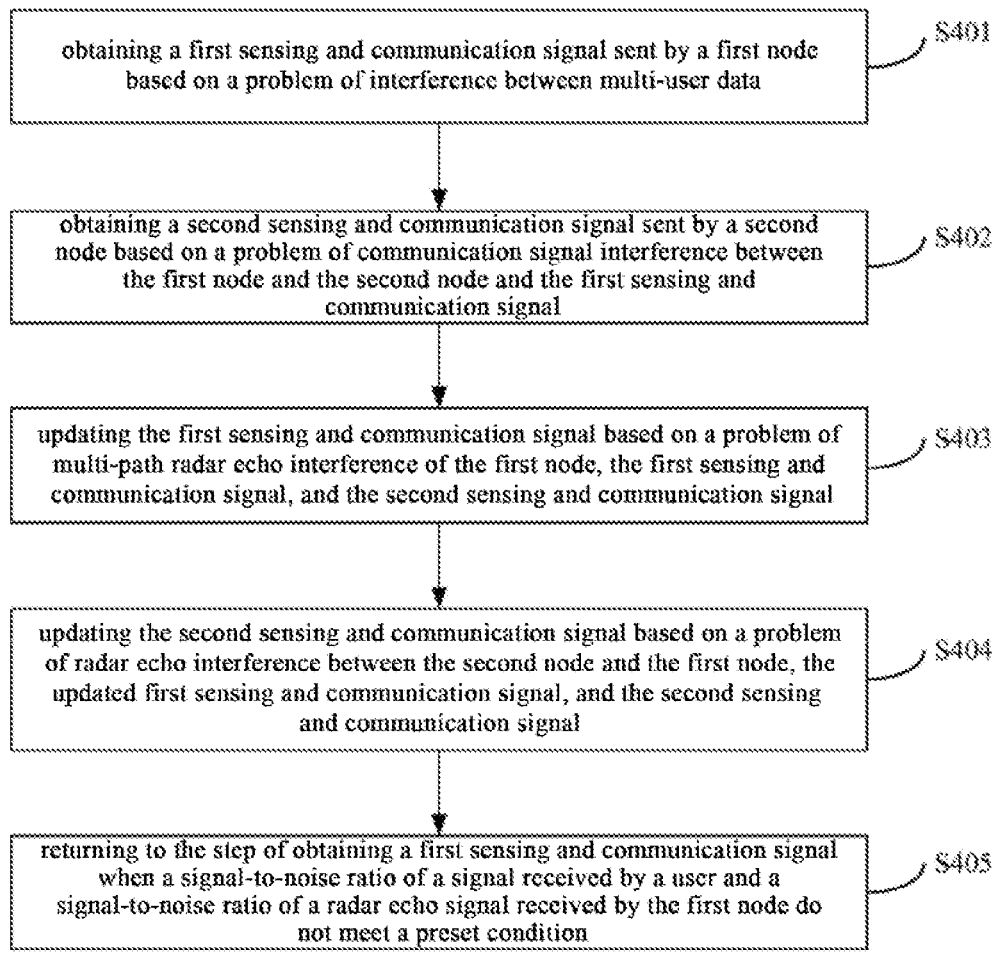
FIG. 4 is a step diagram of a cooperative precoding method according to an embodiment of the present disclosure.

As shown in FIG. 4, an embodiment of the present disclosure provides a cooperative precoding method including:

Step S401: obtaining a first sensing and communication signal $X_1$ sent by a first node based on a problem $\Phi_1$ of interference between multi-user data;

In the embodiment of the present disclosure, the first node and the second node described below are both nodes with integrated sensing and communication, which provide communication data transmission and radar sensing services to a target user at the same time. Here, the first sensing and communication signal $X_1$ is a first integrated sensing and communication signal.

It should be noted that, before the step S401 starts to be executed, it is first determined whether the current iteration number t has reached an iteration number upper limit T, and in the event that it has not reached the iteration number upper limit T, the step S401 is executed.

Step S402: obtaining a second sensing and communication signal $X_2$ sent by a second node based on a problem $\Phi_2$ of communication signal interference between the first node and the second node and the first sensing and communication signal $X_1$;

In the embodiment of the present disclosure, the second node is an adjacent node of the first node. When considering communication mutual interference between the first node and the second node, for the first node, the second sensing and communication signal $X_2$ sent by the second node is an interfering signal with integrated sensing and communication.

Step S403: updating the first sensing and communication signal $X_1$ based on a problem $\Phi_3$ of multi-path radar echo interference of the first node, the first sensing and communication signal $X_1$, and the second sensing and communication signal $X_2$;

Step S404: updating the second sensing and communication signal $X_2$ based on a problem $\Phi_4$ of radar echo interference between the second node and the first node, the updated first sensing and communication signal $X_1$, and the second sensing and communication signal $X_2$;

Further, considering the situation where there exists radar sensing echo mutual interference between the first node and the second node, the second sensing and communication signal $X_2$ is updated based on the updated first sensing and communication signal $X_1$.

Step S405: returning to the step of obtaining a first sensing and communication signal when a signal-to-noise ratio of a signal received by a user and a signal-to-noise ratio of a radar echo signal received by the first node do not meet a preset condition, wherein the preset condition is: the signal-to-noise ratio of the signal received by the user is larger than the first signal-to-noise ratio threshold $F_{C,i}$, and the signal-to-noise ratio of the radar echo signal received by the first node is larger than the second signal-to-noise ratio threshold $F_R$.

It should be noted that, after completing one iteration of the above-described step S401 to step S404, it is determined whether the signal-to-noise ratio of a signal received by a user and the signal-to-noise ratio of a radar echo signal received by the first node meet a preset condition, and in the event that the preset condition is not met, the iteration number t is updated (t=t+1), and it is determined whether the iteration number t has reached the iteration number upper limit T, and in the event that the iteration number upper limit T has not been reached, the method returns to step S401 and restarts executing step S401 to step S404, until the preset condition is met, or in the event that the preset condition is not met but the iteration number upper limit T has been reached, iterations are ended, the first sensing and communication signal $X_1$ and the second sensing and communication signal $X_2$ are obtained, thereby achieving cooperative precoding.

In the embodiment of the present disclosure, wherein, a first sensing and communication signal sent by a first node is obtained based on a problem of interference between multi-user data, a second sensing and communication signal sent by a second node is obtained based on a problem of communication signal interference between the first node and the second node and the first sensing and communication signal, the first sensing and communication signal is updated based on a problem of multi-path radar echo interference of the first node, the first sensing and communication signal, and the second sensing and communication signal, the second sensing and communication signal is updated based on a problem of radar echo interference between the second node and the first node, the updated first sensing and communication signal, and the second sensing and communication signal, and in the event that the signal-to-noise ratio of a signal received by a user and the signal-to-noise ratio of a radar echo signal received by the first node do not meet a preset condition, returning to the step of obtaining a first sensing and communication signal, which solves the problem of joint processing in the event that between nodes with integrated sensing and communication, there exist communication interference and radar sensing echo mutual interference, which enhancing the sensing performance of nodes with integrated sensing and communication while at the same time improving the communication performance of a target user.

Optionally, before step S401, the cooperative precoding method further includes:

setting initialization parameters: a first matrix $H_{1,C}$, a second matrix $H_{2,C}$, a third matrix $H_{1,R}$, and a fourth matrix $H_{2,R}$; the number of transmitting antennas $N_t$ and the number of receiving antennas $N_r$ of a node, $N=N_t=N_r$; the first signal-to-noise threshold $F_{C,i}$, and the second signal-to-noise threshold $F_R$; and, the iteration number upper limit T and the initial iteration number t=0.

Specifically, the first matrix $H_{1,C}$, the second matrix $H_{2,C}$, the third matrix $H_{1,R}$, and the fourth matrix $H_{2,R}$ are obtained based on a pre-constructed integrated sensing and communication mutual interference channel model $H_{ISAC}$, the first matrix $H_{1,C}$ is a communication channel matrix of the first node, the second matrix $H_{2,C}$ is a communication interference channel matrix of the second node, the third matrix $H_{1,R}$ is a radar echo channel matrix of the first node, the fourth matrix $H_{2,R}$ is a radar echo interference channel matrix of the second node.

Figure 5:
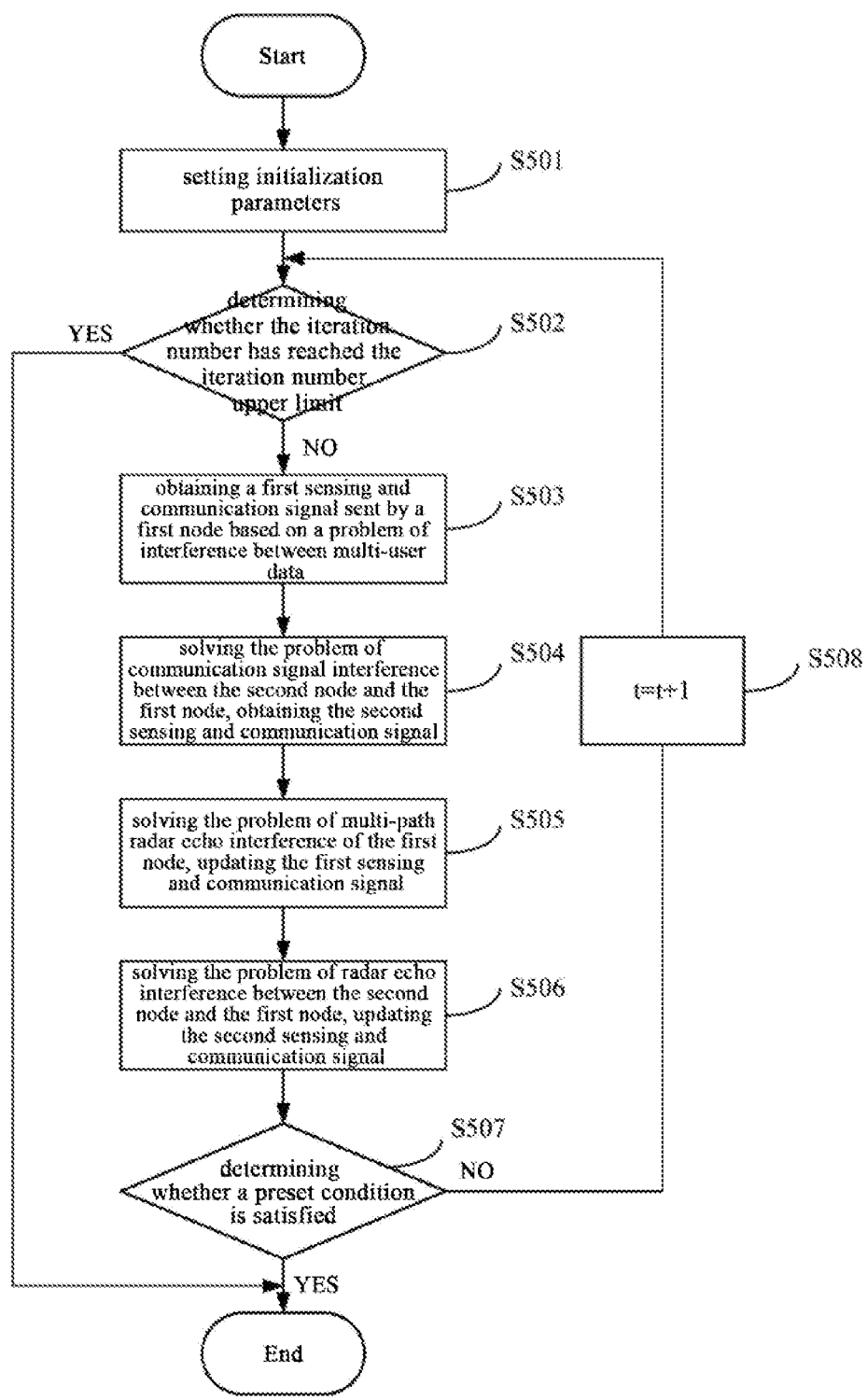
FIG. 5 is a flowchart of a cooperative precoding method according to an embodiment of the present disclosure.

Below, in reference to FIG. 5, a flow chart of cooperative precoding is described specifically.

Step S501: setting initialization parameters: a first matrix $H_{1,C}$, a second matrix $H_{2,C}$, a third matrix $H_{1,R}$, and a fourth matrix $H_{2,R}$; the number of transmitting antennas $N_t$ and the number of receiving antennas $N_r$ of a node, $N=N_t=N_r$; the first signal-to-noise threshold $F_{C,i}$, and the second signal-to-noise threshold $F_R$; and, the iteration number upper limit T and the initial iteration number t=0.

Step S502: determining whether the current iteration number t has reached the iteration number upper limit T.

When the result of step S502 is No, go to step S503: solving the problem $\Phi_1$ of interference between multi-user data, obtaining the first sensing and communication signal $X_1$ sent by the first node.

Step S504: solving the problem $\Phi_2$ of communication signal interference between the second node and the first node, obtaining the second sensing and communication signal $X_2$ sent by the second node.

Step S505: solving the problem $\Phi_3$ of multi-path radar echo interference of the first node, updating the first sensing and communication signal $X_1$.

Step S506: solving the problem of radar echo interference between the second node and the first node, updating the second sensing and communication signal $X_2$.

Step S507: determining whether the signal-to-noise ratio of a signal received by a user and the signal-to-noise ratio of a radar echo signal received by the first node satisfy a preset condition.

When the result of step S507 is No, go to step S508: updating the iteration number t, t=t+1, and return to step S502.

When the result of step S502 is Yes, or the result of step S507 is Yes, terminating the cooperative precoding process.

Optionally, the cooperative precoding method further includes:

constructing the integrated sensing and communication mutual interference channel model $H_{ISAC}$ according to the following steps:

constructing a communication mutual interference channel model $H_C$ and a radar sensing echo mutual interference channel model $H_R$ respectively;

constructing the integrated sensing and communication mutual interference channel model $H_{ISAC}$ based on the communication mutual interference channel model $H_C$ and the radar sensing echo mutual interference channel model $H_R$.

Figure 6:
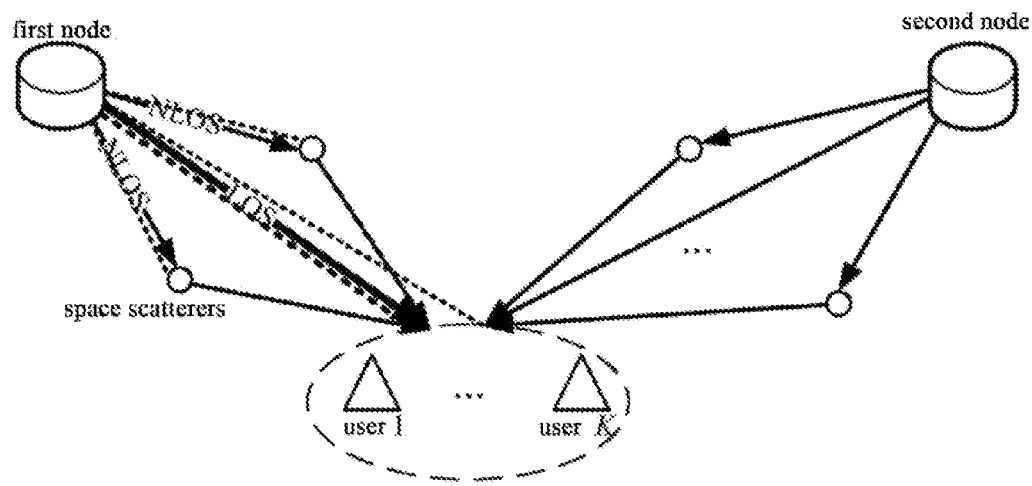
FIG. 6 is a schematic view of the integrated sensing and communication mutual interference channel model according to an embodiment of the present disclosure.

It should be noted that, as shown in FIG. 6, $H_{ISAC}=H_C \cdot H_R$, i.e., the integrated sensing and communication mutual interference channel model $H_{ISAC}$ is the union of the communication mutual interference channel model $H_C$ and the radar sensing echo mutual interference channel model $H_R$.

Optionally, in the cooperative precoding method, constructing a communication mutual interference channel model $H_C$ includes:

obtaining a channel from the first node to a target user and a channel from the second node to the target user based on a steering vector of a transmitting antenna of the first node and a steering vector of a transmitting antenna of the second node;

obtaining a communication channel of the first node and a communication channel of the second node based on the channel from the first node to the target user and the channel from the second node to the target user;

constructing the communication mutual interference channel model based on the communication channel of the first node and the communication channel of the second node.

Figure 7:
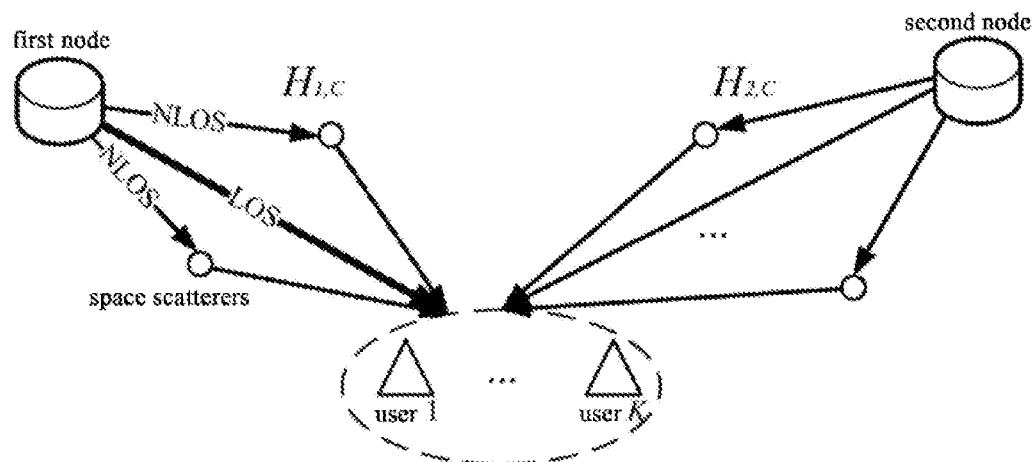
FIG. 7 is a schematic view of a communication mutual interference channel model according to an embodiment of the present disclosure.

In the embodiment of the present disclosure, as shown in FIG. 7, the communication mutual interference channel comprises a channel from the node 1 (i.e., the first node) with integrated sensing and communication to a target user, as well as an interference channel from an adjacent node 2 (i.e., the second node) with integrated sensing and communication to the target user. A signal received by a transceiver includes not only a LOS (Line of Sight) path, but also a NLOS (Non Line of Sight) path. In other words, a transmitting signal is subject to influences of reflection, infraction, and scattering by an object in a space.

The steps of constructing the communication mutual interference channel model $H_C$ are as follows:

First, assuming that, in the embodiment of the present disclosure, the numbers of transmitting antennas of nodes are all $N_t$, the target users are all single-antenna users, and the number of users is K, then the communication mutual interference channel model $H_C$ can be expressed as the union of the communication channels of two nodes with integrated sensing and communication (i.e., the first node and the second node):

$$H_C = H_{1,C} \cup H_{2,C}$$

wherein, $H_{1,C}$ is the communication channel of the first node; $H_{2,C}$ is the communication channel of the second node;

$$H_{1,C} = [h_{1,1}, h_{1,2}, \ldots, h_{1,K}]^T$$

$$H_{2,C} = [h_{2,1}, h_{2,2}, \ldots, h_{2,K}]^T$$

$h_{1,i}$ represents a sub-channel from the first node to the $i^{th}$ user, which can be expressed as:

$$h_{1,i} = \sqrt{N_t} \sum_{l=0}^{L_{p1}-1} \alpha_{1,i,l} A_{1,i,t}^H(\theta_{1,i,t}^l)$$

$h_{2,i}$ represents a sub-channel from the second node to the $i^{th}$ user, which can be expressed as:

$$h_{2,i} = \sqrt{N_t} \sum_{l=0}^{L_{p2}-1} \alpha_{2,i,l} A_{2,i,t}^H(\theta_{2,i,t}^l)$$

wherein, l represents the $l^{th}$ path; $L_{p1}$ and $L_{p2}$ represent respectively the total numbers of multi-paths of the first node and the second node; $a_{1,i,l}$ represents a multi-path attenuation coefficient; $A_{1,i,t}(\theta_{1,i,t}^l)$ and $A_{2,i,t}(\theta_{2,i,t}^l)$ represent respectively the steering vectors of transmitting antennas of the first node and the second node, specifically, as follows: i $$A_{1,i,t}(\theta_{1,i,t}^l) = \frac{1}{\sqrt{N_t}} \left[1, e^{-j\frac{2\pi}{\lambda}\Delta d \sin(\theta_{1,i,t}^l)}, \ldots, e^{-j\frac{2\pi}{\lambda}(N_t-1)\Delta d \sin(\theta_{1,i,t}^l)}\right]^T$$

$$A_{2,i,t}(\theta_{2,i,t}^l) = \frac{1}{\sqrt{N_t}} \left[1, e^{-j\frac{2\pi}{\lambda}\Delta d \sin(\theta_{2,i,t}^l)}, \ldots, e^{-j\frac{2\pi}{\lambda}(N_t-1)\Delta d \sin(\theta_{2,i,t}^l)}\right]^T$$

wherein, $\Delta d$ represents the distance between elements of an antenna array, which generally satisfies $$\Delta d = \frac{\lambda}{2}.$$

The dimensions of both $A_{1,i,t}(\theta_{1,i,t}^l)$ and $A_{2,i,t}(\theta_{2,i,t}^l)$ are $N_t \times 1$, and thus the dimensions of $h_{1,i}$ and $h_{2,i}$ are $1 \times N_t$, and the dimensions of $H_{1,C}$ and $H_{2,C}$ are $K \times N_t$.

Optionally, in the cooperative precoding method, constructing a radar sensing echo mutual interference channel model $H_R$ includes:

constructing the radar sensing echo mutual interference channel model $H_R$ based on a radar echo channel $H_{1,R}$ of the first node and a radar echo interference channel $H_{2,R}$ of the second node.

Figure 8:
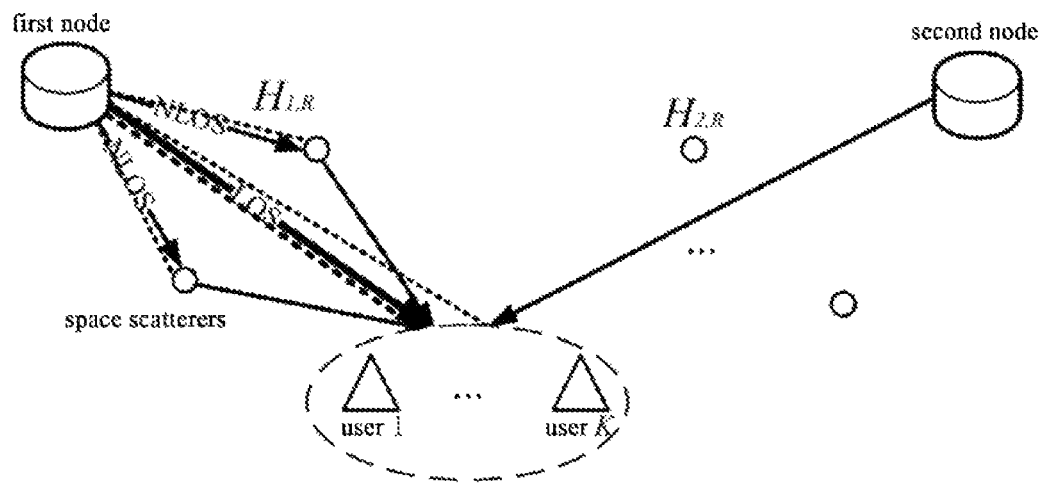
FIG. 8 is the schematic view of the radar sensing echo mutual interference channel model according to an embodiment of the present disclosure.

In the embodiment of the present disclosure, as shown in FIG. 8, a channel of radar sensing echo mutual interference between nodes with integrated sensing and communication comprises a "first node→target user→first node" channel from a node with integrated sensing and communication itself (i.e., the first node), via a target user, to the node with integrated sensing and communication itself, and a "second node→target user→first node" channel from an adjacent node with integrated sensing and communication (i.e., the second node), via the target user, to the node with integrated sensing and communication itself (i.e., the first node). An active radar mainly uses a target line of sight (LOS) path in FIG. 4 to achieve sensing. Other multi-path echo, as an interference signal, will produce false alarm.

The radar sensing echo mutual interference channel model $H_R$ represents the union of its own echo channel (i.e., the radar echo channel $H_{1,R}$ of the first node) and the interference echo channel of an adjacent node with integrated sensing and communication (i.e., the radar echo interference channel $H_{2,R}$ of the second node):

$$H_R = H_{1,R} \cup H_{2,R}$$

wherein, the steps of constructing the radar echo channel $H_{1,R}$ of the first node are as follows:

$$H_{1,R} = \sqrt{N_t N_T} \sum_{l=0}^{L_{p1}-1} \beta_{1,l} A_{1,T}(\theta_{1,t}^l) A_{1,t}^H(\theta_{1,t}^l) =$$

$$\sqrt{N_t N_r} \beta_{1,0} A_{1,r}(\theta_{1,t}^0) A_{1,t}^H(\theta_{1,t}^0) + \sqrt{N_t N_r} \sum_{l=1}^{L_{p1}} \beta_{1,l} A_{1,r}(\theta_{1,t}^l) A_{1,t}^H(\theta_{1,t}^l)$$

The first term represents an effective target line of sight echo channel, and the second term represents another channel of other multi-path interference in the same wave beam. $L_{p1}$ represents a multi-path total number of the first node; $\beta_{1,l}$ represents a multi-path attenuation coefficient; $\theta_{1,t}^l$ represents a transmitting angle of the first node. It should be noted that, representing a receiving angle $\theta_{1,r}^l$ of the first node should be maintained equal to $\theta_{1,t}^l$, i.e., $\theta_{1,r}^l = \theta_{1,t}^l$. It should be noted that, regarding radar sensing, an integrated sensing and communication signal does not distinguish between different target users. Therefore, one can consider only a channel from a node with integrated sensing and communication to a target user area, without considering a channel of the node with integrated sensing and communication to a specific target user. Thus, the dimensions of $A_{1,t}(\theta_{1,t}^l)$ and $A_{1,r}(\theta_{1,t}^l)$ are respectively $N_t \times 1$ and $N_r \times 1$, and the dimensions of $H_{1,R}$ are $N_r \times N_t$.

The steps of constructing the radar echo interference channel $H_{2,R}$ of the second node are as follows:

$$H_{2,R} = \sum_{l=0}^{L_{p2}-1} \beta_{2,l} A_{1,r}(\theta_{1,t}^l) A_{2,t}^H(\theta_{2,t}^l)$$

wherein, $L_{p2}$ represents a multi-path total number of the second node; $\beta_{2,l}$ represents a multi-path attenuation coefficient; $\theta_{2,t}^l$ represents a transmitting angel of the second node.

As multiple times of scattering will cause a large attenuation of the signal, in the embodiment of the present disclosure, only the effective target line of sight echo channel and the echo channel of one time of scattering are considered. Thus, $H_{2,R}$ can be simplified as:

$$H_{2,R} = \sqrt{N_t N_r} \beta_{2,0} A_{1,r}(\theta_{1,t}^0) A_{2,t}^H(\theta_{2,t}^0)$$

When the number of transmitting antenna array elements of the first node and the second node is the same, the dimensions of $H_{2,R}$ are also $N_r \times N_t$.

Optionally, in the cooperative precoding method, based on a problem $\Phi_1$ of interference between multi-user data includes:

solving a minimum value of a transmitting signal total power of the first node when a first constraint condition is satisfied;

wherein, the first constraint condition includes that:

a ratio between a sum of a useful signal received by a user and a white Gaussian noise of a communication channel, and the useful signal received by the user, is smaller than or equal to the reciprocal of a first sub-signal-to-noise threshold $F_{c,i,l}$, wherein the useful signal received by the user is obtained according to the first matrix $H_{1,C}$;

a signal data matrix $T_{1,i}$ of the first node is larger than or equal to a first preset value, the first preset value is 0 here.

It should be noted that, obtaining the signal received by the user based on the integrated sensing and communication mutual interference channel model $H_{ISAC}$ is:

$$Y_{UE} = H_{1,C} X_1 + H_{2,C} X_2 + Z_C$$

wherein, $Z_C$ represents a white Gaussian noise of a communication channel; $X_2$ represents the second sensing and communication signal sent by the second node, i.e., a interference signal of integrated sensing and communication, having the dimensions of $N_t \times L$; $X_1 = W_t^T S$ represents the first sensing and communication signal sent by the first node; $S = [S_1, S_2, \ldots, S_K]^T$ is a user data series, having the dimensions of $K \times L$, L representing the length of a data stream; $W_t = [w_{1,t}, w_{2,t}, \ldots, w_{K,t}]^T$ is a precoded code of the transmitting antenna array of the first node, having the dimensions of $K \times N_t$. Thus, the dimensions of $X_1$ are $N_t \times L$, and the dimensions of $Y_{UE}$ are $1 \times L$.

In the process of communication, user data sent by a node with integrated sensing and communication comprise data of K users, and there exists certain interference between user data. Thus, the signal received by the $i^{th}$ user is expressed as:

$$Y_{UE,i} = h_{1,i} w_{i,t}^T s_i + \sum_{j=1, j \neq i}^{K} h_{1,j} w_{j,t}^T s_j + h_{2,i} X_2 + Z_C$$

wherein, the first term is a useful signal received by the user, the second term is an interference signal generated by other user signals, the third term is an interference signal generated by the second node, and the fourth term is a white Gaussian noise of a communication channel. Thus, the SINR of a signal received by each user is expressed as follows:

$$\gamma_{c,i} = \frac{|h_{1,i} w_{i,t}^T s_i|}{\sum_{j=1, j \neq 1}^{K} |h_{1,i} w_{j,t}^T s_j| + |h_{2,i} X_2| + Z_C}$$

In the embodiment of the present disclosure, the problem $\Phi_1$ of interference between multi-user data is described as:

$$p_1 : \min_{X_1} \frac{N_t}{L} \text{diag}(X_1 X_1^H)$$

$$\text{s.t.} \sum_{i=1}^{K} \frac{\sum_{j=1, j \neq i}^{K} tr(A_{1,i} T_{1,j}) + Z_C}{tr(A_{1,i} T_{1,i})} \leq \frac{1}{F_{c,i,1}}$$

$$T_{1,i} = T_{1,i}^H T_{1,i} \geq 0$$

wherein:

$$A_{1,i} = h_{1,i}^H h_{1,i}$$

$$T_{1,i} = x_{1,i} x_{1,i}^H$$

$$X_1 = \sum_{i=1}^{K} x_{1,i} = \sum_{i=1}^{K} w_{i,t}^T s_i$$

By solving the Lagrangian dual problem of the problem $\Phi_1$, the following formula of the first sensing and communication signal $X_1$ is obtained:

$$x_{1,i}^{(t)} = x_{1,i}^{(t)} - \delta_t \left( 2x_{1,i}^{(t-1)} \left( \frac{N_t}{L} - u \cdot A_{1,i}^H \right) \right)$$

$$X_1^{(t)} = \sum_{i=1}^{K} x_{1,i}^{(t)}$$

wherein, $\delta_t$ is an iteration step, which can be obtained by a linear backtracking algorithm, u is a Lagrangian constant that satisfies the following formula:

$$\frac{\partial \acute{L}}{\partial u} = tr(A_{1,i}T_{1,i}) - F_{c,i,1} \left( \sum_{j=1,j\neq i}^{K} tr(A_{1,i}T_{1,j}) + Z_C \right) = 0$$

wherein, $\acute{L}$ is a Lagrangian function.

Optionally, in the cooperative precoding method, the problem $\Phi_2$ of communication signal interference between the second node and the first node includes:
  solving a minimum value of a transmitting signal total power of the second node when a second constraint condition is satisfied;
  wherein, the second constraint condition includes:
  a ratio between an interference signal of the second node and a useful signal received by a user is smaller than or equal to a reciprocal of a second sub-signal-to-noise threshold $F_{c,i,2}$, the interference signal of the second node is obtained according to the second matrix $H_{2,C}$;
  a signal data matrix $T_{1,i}$ of the first node is larger than or equal to a first preset value, the first preset value is 0 here.

In the embodiment of the present disclosure, the problem $\Phi_2$ of communication signal interference between the second node and the first node is described as:

$$\Phi_2: \min_{X_2} \frac{N_t}{L} \text{diag}(X_2 X_2^H)$$

$$\text{s.t.} \quad \frac{tr(A_{2,i} X_2 X_2^H)}{tr(A_{1,i} T_{1,i})} \leq \frac{1}{F_{c,i,2}}$$

$$T_{1,i} = T_{1,i}^H, T_{1,i} \geq 0$$

wherein:

$$A_{1,i} = h_{1,i}^H h_{1,i}$$

$$A_{2,i} = h_{2,i}^H h_{2,i}$$

$$T_{1,i} = x_{1,i} x_{1,i}^H$$

$$X_1 = \sum_{i=1}^{K} x_{1,i} = \sum_{i=1}^{K} w_{i,t}^T s_i$$

$$X_2 = \sum_{i=1}^{K} x_{2,i} = \sum_{i=1}^{K} w_{i,t}^T s_i$$

By solving the Lagrangian dual problem of the problem $\Phi_2$, the following formula of the second sensing and communication signal $X_2$ is obtained:

$$X_2^{(t)} = X_2^{(t)} - \delta_t \left( 2X_2^{(t-1)} \left( \frac{N_t}{L} + u \cdot F_{c,i,2} A_{1,i}^H \right) \right)$$

$$\frac{\partial \acute{L}}{\partial u} = tr(A_{1,i}T_{1,i}) - F_{c,i,2}(tr(A_{2,i}X_2 X_2^H) + Z_C) = 0$$

Optionally, in the cooperative precoding method, the problem $\Phi_3$ of multi-path echo interference of the first node includes:
  solving a minimum value of a transmitting signal total power of the first node when a third constraint condition is satisfied;
  wherein, the third constraint condition includes:
  a ratio between a sum of a useful radar echo signal received by the first node and a white Gaussian noise of a radar echo channel, and the useful radar echo signal received by the first node, is smaller than or equal to a reciprocal of a third sub-signal-to-noise threshold $F_{R,1}$, the useful radar echo signal received by the first user is obtained according to the third matrix $H_{1,R}$.

It should be noted that the radar echo signal received by the first node based on the integrated sensing and communication mutual interference channel model $H_{ISAC}$ is:

$$Y_{SBS1} = H_{1,R} X_1 + H_{2,R} X_2 + Z_R$$

wherein, $Z_R$ represents a white Gaussian noise of a radar echo channel. Thus, based on the above formulas describing $H_{1,R}$ and $H_{2,R}$, the radar echo signal received by the first node can be further expressed as:

$$Y_{SBS_1} = \sqrt{N_t N_r} \beta_{1,0} A_{1,r}(\theta_{1,t}^0) A_{1,t}^H(\theta_{1,t}^0) X_1 + Z_R +$$

$$\sqrt{N_t N_r} \left( \sum_{l=1}^{L_{p1}} \beta_{1,l} A_{1,r}(\theta_{1,t}^l) A_{1,t}^H(\theta_{1,t}^l) X_1 + \beta_{2,0} A_{1,r}(\theta_{1,t}^0) A_{2,t}^H(\theta_{2,t}^0) X_2 \right)$$

wherein, the first term is a useful radar echo signal received by the first node, the second term is a white Gaussian noise of the radar echo channel, and the third term is a radar echo interference signal comprising a multi-path radar echo interference signal of the first node itself and a radar echo interference signal of the second node. Thus, the SINR of the radar echo signal received by the first node can be expressed as follows:

$$y_R = \frac{\left| \beta_{1,0} A_{1,r}(\theta_{1,t}^0) A_{1,t}^H(\theta_{1,t}^0) X_1 \right|}{\left| \beta_{2,0} A_{1,r}(\theta_{1,t}^0) A_{2,t}^H(\theta_{2,t}^0) X_2 \right| + \frac{Z_R}{\sqrt{N_t N_r}} + \sum_{l=1}^{L_{p1}} \left| \beta_{1,l} A_{1,r}(\theta_{1,c}^l) A_{1,t}^H(\theta_{1,t}^l) X_1 \right|}$$

In the embodiment of the present disclosure, the problem $\Phi_3$ of multi-path echo interference of the first node is described as:

$$\flat_3: \min_{X_1} \frac{N_t}{L} \mathrm{diag}(X_1 X_1^H)$$

$$\text{s.t.} \quad \frac{Z_R + \sum_{i=1}^{L_{p1}-1} tr(B_{1,l} X_1 X_1^H)}{tr(B_{1,0} X_1 X_1^H)} \leq \frac{1}{F_{R,1}}$$

wherein, $$B_{1,l} = g_{1,l}^H g_{1,l}$$

Here, l represents the $l^{th}$ path, and $g_{1,i}$ represents the $l_{th}$ path channel in $H_{1,R}$, which is calculated based on the formula of $H_{1,R}$.

By solving the Lagrangian dual problem of the problem $\Phi_3$, the following formula for updating the first sensing and communication signal $X_1$ is obtained:

$$X_1^{(t)} = X_1^{(t)} - \delta_t \left( 2X_2^{(t-1)} \left( \frac{N_t}{L} + u \cdot \left( -B_{1,0}^H + F_{R,1} \sum_{l=1}^{L_{p1}} B_{1,l}^H \right) \right) \right)$$

$$\frac{\partial L'}{\partial u} = tr(B_{1,0} X_1 X_1^H) - F_{R,1} \left( \sum_{l=1}^{L_{p1}} tr(B_{1,l} X_1 X_1^H) + Z_R \right) = 0$$

Optionally, in the cooperative precoding method, the problem $\Phi_4$ of echo interference between the second node and the first node includes:
solving a minimum value of a transmitting signal total power of the second node when a fourth constraint condition is satisfied;
wherein, the fourth constraint condition includes:
a ratio between a radar echo interference signal of the second node and a useful radar echo signal received by the first node is smaller than or equal to a reciprocal of a fourth sub-signal-to-noise threshold $F_{R,2}$, wherein the radar echo interference signal of the second node is obtained according to the fourth matrix $H_{2,R}$.

In the embodiment of the present disclosure, the problem $\Phi_4$ of echo interference between the second node and the first node is described as:

$$\flat_4: \min_{X_2} \frac{N_t}{L} \mathrm{diag}(X_2 X_2^H)$$

$$\text{s.t.} \quad \frac{tr(B_{2,0} X_2 X_2^H)}{tr(B_{1,0} X_1 X_1^H)} \leq \frac{1}{F_{R,2}}$$

wherein, $$B_{1,l} = g_{1,l}^H g_{1,l}$$

$$B_{2,l} = g_{2,l}^H g_{2,l}$$

Here, l represents the $l^{th}$ path; $g_{1,l}$ represents the $l_{th}$ path channel in $H_{1,R}$, which is calculated based on the formula of $H_{1,R}$; $g_{2,l}$ represents the $l_{th}$ path channel in $H_{2,R}$, which is calculated based on the formula of $H_{2,R}$.

By solving the Lagrangian dual problem of the problem $\Phi_4$, the following formula for updating the second sensing and communication signal $X_2$ is obtained:

$$X_2^{(t)} = X_2^{(t)} - \delta_t \left( 2X_2^{(t-1)} \left( \frac{N_t}{L} + u \cdot F_{R,2} B_{2,0}^H \right) \right)$$

$$\frac{\partial L'}{\partial u} = tr(B_{1,0} X_1 X_1^H) - F_{R,2}(tr(B_{2,0} X_2 X_2^H) + Z_R) = 0$$

It should be noted that the first signal-to-noise ratio threshold $F_{C,i}$, the first sub-signal-to-noise threshold $F_{C,i,1}$, and the second sub-signal-to-noise threshold $F_{C,i,2}$, satisfy the following formula:

$$\frac{1}{F_{C,i}} = \frac{1}{F_{C,i,1}} + \frac{1}{F_{C,i,2}}$$

The second signal-to-noise ratio threshold $F_R$, the third sub-signal-to-noise threshold $F_{R,1}$, and the fourth sub-signal-to-noise threshold $F_{R,2}$, satisfy the following formula:

$$\frac{1}{F_R} = \frac{1}{F_{R,1}} + \frac{1}{F_{R,2}}$$

Figure 9:
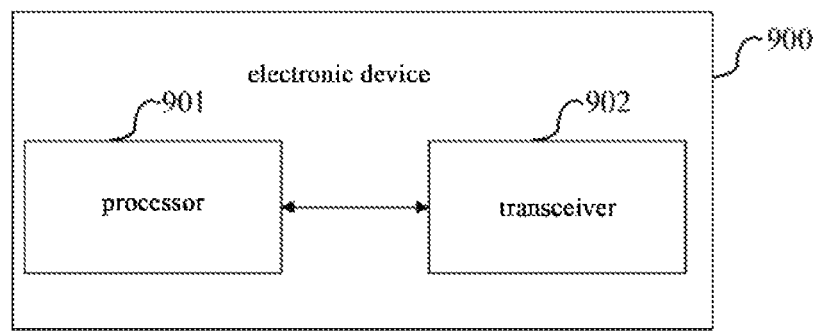
FIG. 9 is a first schematic structural view of an electronic device according to an embodiment of the present disclosure.

As shown in FIG. 9, an embodiment of the present disclosure further provides an electronic device 900 comprising a processor 901 and a transceiver 902, wherein:
the processor 901 is configured to obtain a first sensing and communication signal sent by a first node based on a problem of interference between multi-user data;
the processor 901 is further configured to obtain a second sensing and communication signal sent by a second node based on a problem of communication signal interference between the first node and the second node and the first sensing and communication signal;
the processor 901 is further configured to update the first sensing and communication signal based on a problem of multi-path radar echo interference of the first node, the first sensing and communication signal, and the second sensing and communication signal;
the processor 901 is further configured to update the second sensing and communication signal based on a problem of radar echo interference between the second node and the first node, the updated first sensing and communication signal, and the second sensing and communication signal;
the processor 901 is further configured to return to the step of obtaining a first sensing and communication signal when a signal-to-noise ratio of a signal received by a user and a signal-to-noise ratio of a radar echo signal received by the first node do not meet a preset condition, wherein the preset condition is: the signal-to-noise ratio of the signal received by the user is larger than a first signal-to-noise ratio threshold and the signal-to-noise ratio of the radar echo signal received by the first node is larger than a second signal-to-noise ratio threshold.

In embodiments of the present disclosure, wherein, a first sensing and communication signal sent by a first node is obtained based on a problem of interference between multi-user data, a second sensing and communication signal sent by a second node is obtained based on a problem of communication signal interference between the first node and the second node and the first sensing and communication signal, the first sensing and communication signal is updated based on a problem of multi-path radar echo interference of the first node, the first sensing and communication signal, and the second sensing and communication signal, the second sensing and communication signal is updated based on a problem of radar echo interference between the second node and the first node, the updated first sensing and communication signal, and the second sensing and communication signal, and in the event that the signal-to-noise ratio of a signal received by a user and the signal-to-noise ratio of a radar echo signal received by the first node do not meet a preset condition, returning to the step of obtaining a first sensing and communication signal, which solves the problem of joint processing in the event that between nodes with integrated sensing and communication, there exist communication interference and radar sensing echo mutual interference, which enhancing the sensing performance of nodes with integrated sensing and communication while at the same time improving the communication performance of a target user.

Optionally, the processor 901 of the electronic device 900 is further configured to obtain a first matrix, a second matrix, a third matrix, and a fourth matrix based on a pre-constructed integrated sensing and communication mutual interference channel model, the first matrix is a communication channel matrix of the first node, the second matrix is a communication interference channel matrix of the second node, the third matrix is a radar echo channel matrix of the first node, the fourth matrix is a radar echo interference channel matrix of the second node.

Optionally, the processor 901 of the electronic device 900 is further configured to construct the integrated sensing and communication mutual interference channel model according to the following steps:
constructing a communication mutual interference channel model and a radar sensing echo mutual interference channel model respectively;
constructing the integrated sensing and communication mutual interference channel model based on the communication mutual interference channel model and the radar sensing echo mutual interference channel model.

Optionally, the processor 901 of the electronic device 900 is specifically configured to obtain a channel from the first node to a target user and a channel from the second node to the target user based on a steering vector of a transmitting antenna of the first node and a steering vector of a transmitting antenna of the second node;
obtain a communication channel of the first node and a communication channel of the second node based on the channel from the first node to the target user and the channel from the second node to the target user;
construct the communication mutual interference channel model based on the communication channel of the first node and the communication channel of the second node.

Optionally, the processor 901 of the electronic device 900 is specifically configured to construct the radar sensing echo mutual interference channel model based on a radar echo channel of the first node and a radar echo interference channel of the second node.

Optionally, the processor 901 of the electronic device 900 is specifically configured to solve a minimum value of a transmitting signal total power of the first node when a first constraint condition is satisfied;
wherein, the first constraint condition includes:
a ratio between a sum of a useful signal received by a user and a white Gaussian noise of a communication channel, and the useful signal received by the user, is smaller than or equal to a reciprocal of a first sub-signal-to-noise threshold, wherein the useful signal received by the user is obtained according to the first matrix;
a signal data matrix of the first node is larger than or equal to a first preset value.

Optionally, the processor 901 of the electronic device 900 is specifically configured to solve a minimum value of a transmitting signal total power of the second node when a second constraint condition is satisfied;
wherein, the second constraint condition includes:
a ratio between an interference signal of the second node and a useful signal received by a user is smaller than or equal to a reciprocal of a second sub-signal-to-noise threshold, wherein the interference signal of the second node is obtained according to the second matrix;
a signal data matrix of the first node is larger than or equal to a first preset value.

Optionally, the processor 901 of the electronic device 900 is specifically configured to solve a minimum value of a transmitting signal total power of the first node when a third constraint condition is satisfied;
wherein, the third constraint condition includes:
a ratio between a sum of a useful radar echo signal received by the first node and a white Gaussian noise of a radar echo channel, and the useful radar echo signal received by the first node, is smaller than or equal to a reciprocal of a third sub-signal-to-noise threshold, wherein the useful radar echo signal received by the first user is obtained according to the third matrix.

Optionally, the processor 901 of the electronic device 900 is specifically configured to solve a minimum value of a transmitting signal total power of the second node when a fourth constraint condition is satisfied;
wherein, the fourth constraint condition includes:
a ratio between a radar echo interference signal of the second node and a useful radar echo signal received by the first node is smaller than or equal to a reciprocal of a fourth sub-signal-to-noise threshold, wherein the radar echo interference signal of the second node is obtained according to the fourth matrix.

Figure 10:
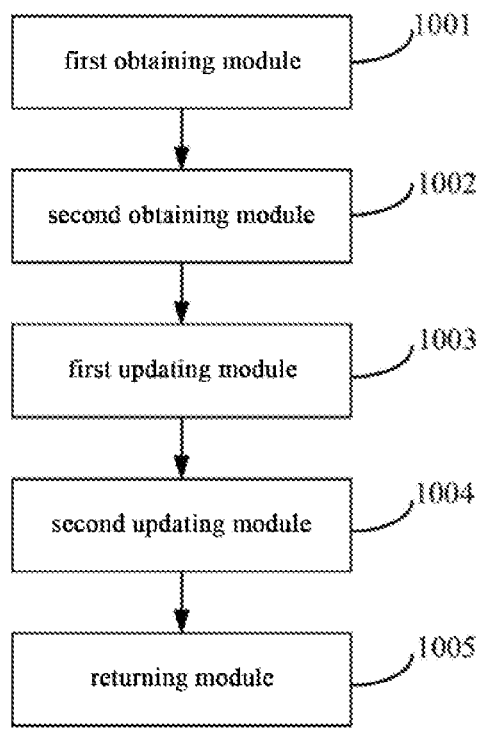
FIG. 10 is a schematic view of a cooperative precoding apparatus according to an embodiment of the present disclosure.

As shown in FIG. 10, an embodiment of the present disclosure further provides a cooperative precoding apparatus comprising:
a first obtaining module 1001, configured to obtain a first sensing and communication signal sent by a first node based on a problem of interference between multi-user data;
a second obtaining module 1002, configured to obtain a second sensing and communication signal sent by a second node based on a problem of communication signal interference between the first node and the second node and the first sensing and communication signal;
a first updating module 1003, configured to update the first sensing and communication signal based on a problem of multi-path radar echo interference of the first node, the first sensing and communication signal, and the second sensing and communication signal;
a second updating module 1004, configured to update the second sensing and communication signal based on a problem of radar echo interference between the second node and the first node, the updated first sensing and communication signal, and the second sensing and communication signal;
a returning module 1005, configured to return to the step of obtaining a first sensing and communication signal when a signal-to-noise ratio of a signal received by a user and a signal-to-noise ratio of a radar echo signal received by the first node do not meet a preset condition, wherein the preset condition is: the signal-to-noise ratio of the signal received by the user is larger than a first signal-to-noise ratio threshold and the signal-to-noise ratio of the radar echo signal received by the first node is larger than a second signal-to-noise ratio threshold.

In embodiments of the present disclosure, wherein, a first sensing and communication signal sent by a first node is obtained based on a problem of interference between multi-user data, a second sensing and communication signal sent by a second node is obtained based on a problem of communication signal interference between the first node and the second node and the first sensing and communication signal, the first sensing and communication signal is updated based on a problem of multi-path radar echo interference of the first node, the first sensing and communication signal, and the second sensing and communication signal, the second sensing and communication signal is updated based on a problem of radar echo interference between the second node and the first node, the updated first sensing and communication signal, and the second sensing and communication signal, and in the event that the signal-to-noise ratio of a signal received by a user and the signal-to-noise ratio of a radar echo signal received by the first node do not meet a preset condition, returning to the step of obtaining a first sensing and communication signal, which solves the problem of joint processing in the event that between nodes with integrated sensing and communication, there exist communication interference and radar sensing echo mutual interference, which enhancing the sensing performance of nodes with integrated sensing and communication while at the same time improving the communication performance of a target user.

Optionally, the cooperative precoding apparatus further comprises:
an obtaining module, configured to obtain a first matrix, a second matrix, a third matrix, and a fourth matrix based on a pre-constructed integrated sensing and communication mutual interference channel model, wherein the first matrix is a communication channel matrix of the first node, the second matrix is a communication interference channel matrix of the second node, the third matrix is a radar echo channel matrix of the first node, and the fourth matrix is a radar echo interference channel matrix of the second node.

Optionally, the cooperative precoding apparatus further comprises:
a constructing module, configured to construct the integrated sensing and communication mutual interference channel model according to the following steps:
constructing a communication mutual interference channel model and a radar sensing echo mutual interference channel model respectively;
constructing the integrated sensing and communication mutual interference channel model based on the communication mutual interference channel model and the radar sensing echo mutual interference channel model.

Optionally, in the cooperative precoding apparatus, the constructing module is specifically configured to:
obtain a channel from the first node to a target user and a channel from the second node to the target user based on a steering vector of a transmitting antenna of the first node and a steering vector of a transmitting antenna of the second node;
obtain a communication channel of the first node and a communication channel of the second node based on the channel from the first node to the target user and the channel from the second node to the target user;
construct the communication mutual interference channel model based on the communication channel of the first node and the communication channel of the second node.

Optionally, in the cooperative precoding apparatus, the constructing module is specifically configured to:
construct the radar sensing echo mutual interference channel model based on a radar echo channel of the first node and a radar echo interference channel of the second node.

Optionally, in the cooperative precoding apparatus, the first obtaining module 1001 is specifically configured to:
solve a minimum value of a transmitting signal total power of the first node when a first constraint condition is satisfied;
wherein, the first constraint condition includes:
a ratio between a sum of a useful signal received by a user and a white Gaussian noise of a communication channel, and the useful signal received by the user, is smaller than or equal to a reciprocal of a first sub-signal-to-noise threshold, wherein the useful signal received by the user is obtained according to the first matrix;
a signal data matrix of the first node is larger than or equal to a first preset value.

Optionally, in the cooperative precoding apparatus, the second obtaining module 1002 is specifically configured to:
solve a minimum value of a transmitting signal total power of the second node when a second constraint condition is satisfied;
wherein, the second constraint condition includes:
a ratio between an interference signal of the second node and a useful signal received by a user is smaller than or equal to a reciprocal of a second sub-signal-to-noise threshold, wherein the interference signal of the second node is obtained according to the second matrix;
a signal data matrix of the first node is larger than or equal to a first preset value.

Optionally, in the cooperative precoding apparatus, the first updating module 1003 is specifically configured to:
solve a minimum value of a transmitting signal total power of the first node when a third constraint condition is satisfied;
wherein, the third constraint condition includes:
a ratio between a sum of a useful radar echo signal received by the first node and a white Gaussian noise of a radar echo channel, and the useful radar echo signal received by the first node, is smaller than or equal to a reciprocal of a third sub-signal-to-noise threshold, wherein the useful radar echo signal received by the first user is obtained according to the third matrix.

Optionally, in the cooperative precoding apparatus, the second updating module 1004 is specifically configured to:
solve a minimum value of a transmitting signal total power of the second node when a fourth constraint condition is satisfied;
wherein, the fourth constraint condition includes:
a ratio between a radar echo interference signal of the second node and a useful radar echo signal received by the first node is smaller than or equal to a reciprocal of a fourth sub-signal-to-noise threshold, wherein the radar echo interference signal of the second node is obtained according to the fourth matrix.

It should be noted that the apparatus provided by the embodiment of the present disclosure can implement all the method steps of the embodiments of the cooperative precoding method, and can achieve the same technical effect. Therefore, the same parts and beneficial effects in this embodiment as those in the method embodiments will not be described in detail herein.

Figure 11:
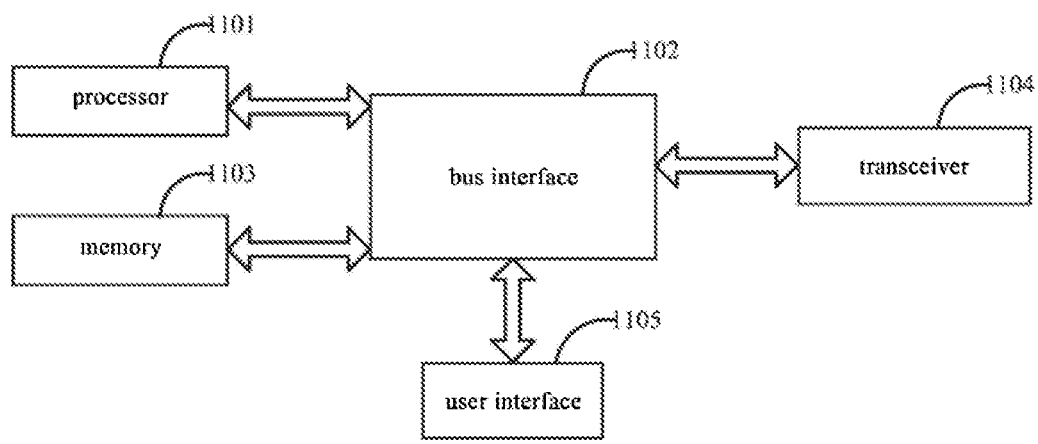
FIG. 11 is a second schematic structural view of an electronic device according to an embodiment of the present disclosure.

An embodiment of the present disclosure also provides an electronic device, as shown in FIG. 11, comprising: a processor 1101, a memory 1103 connected with the processor 1101 by a bus interface 1102, the memory 1103 is configured to store programs and data used by the processor 1101 when performing operations, and the processor 1101 calls and executes the programs and data stored in the memory 1103.

Wherein, the transceiver 1104 is connected to the bus interface 1102 for receiving and sending data under the control of the processor 1101.

Wherein, in FIG. 11, the bus architecture may include any number of interconnected buses and bridges, specifically one or more processors represented by the processor 1101 and various circuits of the memory represented by the memory 1103 are linked together. The bus architecture can also link together various other circuits such as peripherals, voltage regulators, and power management circuits, etc., which are well known in the art and therefore will not be further described herein. The bus interface provides a user interface 1105. The transceiver 1104 may be a plurality of elements, including a transmitter and a receiver, providing a means for communicating with various other devices over transmission media. The processor 1101 is responsible for managing the bus architecture and general processing, and the memory 1103 can store data used by the processor 1101 when performing operations.

Those skilled in the art will understand that all or part of the steps of the above-described embodiments may be completed by hardware, or may be completed by indicating relevant hardware through a program. The program includes instructions for performing some or all steps of the above method. The program can be stored in a readable storage medium, and the storage medium can be any form of storage medium.

An embodiment of the present disclosure also provides a readable storage medium having stored thereon programs or instructions, that when being executed by a processor, cause the processor to implement the cooperative precoding method according to any one of the above aspects.

In the several embodiments provided in this application, it should be understood that the disclosed methods and devices can be implemented in other ways. For example, the device embodiments described above are only illustrative. For example, the division of the units is only a logical function division. In actual implementation, there may be other division methods. For example, multiple units or components may be combined or may be integrated into another system, or some features may be omitted, or not implemented. In another point, the mutual coupling or direct coupling or communication connection shown or discussed may be through some interfaces, and the indirect coupling or communication connection of devices or units may be in electrical, mechanical or in other forms.

In addition, each functional unit in each embodiment of the present disclosure may be integrated into one processing unit, each unit may be physically included separately, or two or more units may be integrated into one unit. The above-mentioned integrated units can be implemented in the form of hardware, or in the form of hardware plus software functional units.

The above-mentioned integrated units realized in the form of software functional units may be stored in a computer-readable storage medium. The above-mentioned software functional units are stored in a storage medium, including several instructions to cause a computer device (which can be a personal computer, server, or network device, etc.) to execute some steps of the receiving and transmitting method described in each embodiment of the present disclosure. The aforementioned storage media include media such as USB flash disk, removable hard disk, read-only memory (referred to as ROM), random access memory (referred to as RAM), magnetic disk or optical disc, and the like, which can store program codes.

The above are preferred embodiments of the present disclosure, it should be pointed out that for those of ordinary skill in the art, some improvements and modification can also be made without departing from the principles of the present disclosure, these improvements and modification also fall within the protection scope of the present disclosure.

What is claimed is:

1. A cooperative precoding method, comprising:
obtaining a first sensing and communication signal sent by a first node based on a problem of interference between multi-user data;
obtaining a second sensing and communication signal sent by a second node based on a problem of communication signal interference between the first node and the second node and the first sensing and communication signal;
updating the first sensing and communication signal based on a problem of multi-path radar echo interference of the first node, the first sensing and communication signal, and the second sensing and communication signal;
updating the second sensing and communication signal based on a problem of radar echo interference between the second node and the first node, the updated first sensing and communication signal, and the second sensing and communication signal;
returning to the step of obtaining a first sensing and communication signal when a signal-to-noise ratio of a signal received by a user and a signal-to-noise ratio of a radar echo signal received by the first node do not meet a preset condition, wherein the preset condition is: the signal-to-noise ratio of the signal received by the user is larger than a first signal-to-noise ratio threshold and the signal-to-noise ratio of the radar echo signal received by the first node is larger than a second signal-to-noise ratio threshold.

2. The cooperative precoding method according to claim 1, wherein, before obtaining a first sensing and communication signal sent by a first node based on a problem of interference between multi-user data, the method further comprises:
obtaining a first matrix, a second matrix, a third matrix, and a fourth matrix based on a pre-constructed integrated sensing and communication mutual interference channel model, wherein the first matrix is a communication channel matrix of the first node, the second matrix is a communication interference channel matrix of the second node, the third matrix is a radar echo channel matrix of the first node, and the fourth matrix is a radar echo interference channel matrix of the second node.

3. The cooperative precoding method according to claim 2, wherein, the method further comprises:
constructing the integrated sensing and communication mutual interference channel model according to the following steps:
constructing a communication mutual interference channel model and a radar sensing echo mutual interference channel model respectively;
constructing the integrated sensing and communication mutual interference channel model based on the communication mutual interference channel model and the radar sensing echo mutual interference channel model.

4. The cooperative precoding method according to claim 3, wherein, constructing a communication mutual interference channel model comprises:
obtaining a channel from the first node to a target user and a channel from the second node to the target user based on a steering vector of a transmitting antenna of the first node and a steering vector of a transmitting antenna of the second node;
obtaining a communication channel of the first node and a communication channel of the second node based on the channel from the first node to the target user and the channel from the second node to the target user;
constructing the communication mutual interference channel model based on the communication channel of the first node and the communication channel of the second node.

5. The cooperative precoding method according to claim 3, wherein, constructing a radar sensing echo mutual interference channel model comprises:
constructing the radar sensing echo mutual interference channel model based on a radar echo channel of the first node and a radar echo interference channel of the second node.

6. The cooperative precoding method according to claim 2, wherein, the problem of interference between multi-user data comprises:
solving a minimum value of a transmitting signal total power of the first node when a first constraint condition is satisfied;
wherein, the first constraint condition comprises:
a ratio between a sum of a useful signal received by a user and a white Gaussian noise of a communication channel, and the useful signal received by the user, is smaller than or equal to a reciprocal of a first sub-signal-to-noise threshold, wherein the useful signal received by the user is obtained according to the first matrix;
a signal data matrix of the first node is larger than or equal to a first preset value.

7. The cooperative precoding method according to claim 2, wherein, the problem of communication signal interference between the second node and the first node comprises:
solving a minimum value of a transmitting signal total power of the second node when a second constraint condition is satisfied;
wherein, the second constraint condition comprises:
a ratio between an interference signal of the second node and a useful signal received by a user is smaller than or equal to a reciprocal of a second sub-signal-to-noise threshold, wherein the interference signal of the second node is obtained according to the second matrix;
a signal data matrix of the first node is larger than or equal to a first preset value.

8. The cooperative precoding method according to claim 2, wherein, the problem of multi-path radar echo interference of the first node comprises:
solving a minimum value of a transmitting signal total power of the first node when a third constraint condition is satisfied;
wherein, the third constraint condition comprises:
a ratio between a sum of a useful radar echo signal received by the first node and a white Gaussian noise of a radar echo channel, and the useful radar echo signal received by the first node, is smaller than or equal to a reciprocal of a third sub-signal-to-noise threshold, wherein the useful radar echo signal received by the first user is obtained according to the third matrix.

9. The cooperative precoding method according to claim 2, wherein, the problem of radar echo interference between the second node and the first node comprises:
solving a minimum value of a transmitting signal total power of the second node when a fourth constraint condition is satisfied;
wherein, the fourth constraint condition comprises:
a ratio between a radar echo interference signal of the second node and a useful radar echo signal received by the first node is smaller than or equal to a reciprocal of a fourth sub-signal-to-noise threshold, wherein the radar echo interference signal of the second node is obtained according to the fourth matrix.

10. An electronic device comprising a processor and a transceiver, wherein:
the processor is configured to obtain a first sensing and communication signal sent by a first node based on a problem of interference between multi-user data;
the processor is further configured to obtain a second sensing and communication signal sent by a second node based on a problem of communication signal interference between the first node and the second node and the first sensing and communication signal;
the processor is further configured to update the first sensing and communication signal based on a problem of multi-path radar echo interference of the first node, the first sensing and communication signal, and the second sensing and communication signal;
the processor is further configured to update the second sensing and communication signal based on a problem of radar echo interference between the second node and the first node, the updated first sensing and communication signal, and the second sensing and communication signal;
the processor is further configured to return to the step of obtaining a first sensing and communication signal when a signal-to-noise ratio of a signal received by a user and a signal-to-noise ratio of a radar echo signal received by the first node do not meet a preset condition, wherein the preset condition is: the signal-to-noise ratio of the signal received by the user is larger than a first signal-to-noise ratio threshold and the signal-to-noise ratio of the radar echo signal received by the first node is larger than a second signal-to-noise ratio threshold.

11. An electronic device, comprising: a transceiver, a processor, a memory, and programs or instructions stored in the memory and executable by the processor; wherein the programs or instructions, when executed by the processor, cause the processor to implement the cooperative precoding method according to claim 1.

12. A non-transitory readable storage medium having stored thereon programs or instructions, that when being executed by a processor, cause the processor to implement the cooperative precoding method according to claim 1.

* * * * *